3,009,856
ADRENOCORTICOTROPHIN AND VITAMIN $B_{12}$ COMPOSITIONS
Donald F. M. Bunce II, Chicago, Ill., assignor, by mesne assignments, to Armour & Company, Chicago, Ill., a corporation of Delaware
No Drawing. Filed Dec. 14, 1954, Ser. No. 475,301
4 Claims. (Cl. 167—53)

This invention relates to pharmaceutical compositions suitable for parenteral administration. In one of its aspects, this invention concerns a medicinal product including an adrenocorticotrophin substance and a vitamin $B_{12}$ material.

The adrenocorticotrophin substance is secreted by the pituitary gland of mammals and carried through the blood stream to the adrenal gland where it exerts an effect upon the function of the adrenal cortex. In relatively recent years this adrenocorticotrophic hormone substance has been extracted from pituitary glands and, after concentration and purification, employed as a pharmaceutical product to provide relief in certain pathological conditions of animals and human beings.

The vitamin $B_{12}$ materials are produced in the livers of mammals and by certain microorganisms. The nutritional properties of these materials have long been recognized. In recent years they have been purified and crystallized, and utilized as a medicinal agent in the treatment of pernicious anemia and related physiological disorders.

The special composition of this invention is strikingly effective in the treatment of encephalomyelic diseases of small animals, including posterior paralysis, distemper, chorea, and "hard pad."

Any adrenocorticotrophin substance (ACTH) may be included in this novel composition, but it is desirable to incorporate therein an ACTH substance of a purity suitable for parenteral administration. The methods for producing these ACTH substances are now well known in the art.

The term "vitamin $B_{12}$ materials" employed herein refers to vitamin $B_{12}$ and related materials, including cyanocobalamin, cobalamin (vitamin $B_{12a}$) and hydroxycobalamin (vitamin $B_{12b}$). Although any form of the vitam $B_{12}$ material may be suitably included in this composition, a purified or crystalline product is to be preferred.

When the animal being treated weighs less than about 10 pounds, such as in the treatment of toy breeds of dogs, the ratio of ACTH and vitamin $B_{12}$ in this composition per daily dosage may be, for example, about 15 international units and 500 micrograms, respectively. When a dog or cat, weighing between 10 and 50 pounds, is under treatment, the composition may include, for example, about 30 international units of ACTH or 1,000 micrograms of vitamin $B_{12}$, predicated upon a daily dosage level. If a large breed of dog, weighing more than 50 pounds, is being treated, the daily dosage requirement of ACTH and vitamin $B_{12}$ included in this composition may be, for example, about 60 international units and 2,000 micrograms, respectively. In the therapeusis of a horse, the daily dosage requirement of the ACTH and vitamin $B_{12}$ included in this composition, may be, for example, about 800 international units and 10,000 micrograms, respectively. Thus, the daily dosage level of vitamin $B_{12}$ and ACTH included in the composition may vary within the range of 500 to 20,000 micrograms and 10 to 1,000 international units, respectively. It will be understood that these ratios of vitamin $B_{12}$ and ACTH in the composition are effective for practical purposes but may be varied in some cases or for the treatment of particular physiological disorders.

The present composition may be administered to a patient in combination with an isotonic saline solution. However, better results are achieved when this composition is administered in association with an aqueous gelatin vehicle. The gelatin employed in this embodiment of the invention should be suitable for parenteral administration, i.e., substantially non-toxic, non-antigenic, non-pyrogenic, etc. The only other requirements for this gelatin carrier are purely practical considerations concerned with the techniques of parenteral administration, i.e., gel-point and viscosity, and the regulation of such properties is well known in the art. Other vehicular materials, such as propylene glycol, oils and fats, polysaccharide substances like carboxymethyl cellulose, and combinations of gelatin and polysaccharide substances, may be combined with this composition to produce superior administrative effects.

Also, preservatives, such as phenol and parabenzoic acid, ions like zinc, aluminum and iron, and agents such as phosphorylated phloretin and aluminum monostearate may be incorporated in the composition to obtain special physiological results. In addition, nutrient substances such as glucose, antibiotics and anti-viral agents may be included in the composition.

This invention can be further illustrated by the following examples:

*Example I*

A 30 pound dog, suffering from a severe chorea of the left front leg, and apparently recovered from distemper about two weeks previously, was treated as follows:

A composition, consisting of 30 international units of ACTH and 1000 micrograms of vitamin $B_{12}$ dissolved in 1 cc. of a 16% aqueous solution of gelatin, was injected intramuscularly into the dog. These injections, together with a regimen of controlled diet and rest, were continued for a period of 6 days. After this period, the dog was discharged to its owner, and no symptoms of weakness, tremor, or chorea were apparent in the affected limb.

*Example II*

A large dog, emaciated to the extent that it weighed only 25 pounds and suffering from a generalized paralysis, was presented for treatment. This dog, having a history of distemper, had previously been treated with opiates, sedatives, barbiturates, anti-epileptics, chemotherapeutics, and antibiotics but had not responded.

The dog was injected intramuscularly with daily doses of 2 cc. of a solution containing 15% gelatin, 60 international units of ACTH and 2,000 micrograms of vitamin $B_{12}$ for a period of 12 days. After 8 days of treatment the dog had regained his appetite and was able to stand with some difficulty. On the 10th day it exercised briefly, and by the 12th day could arise, walk, lie down, and exhibited fair muscle tone and voluntary control. The dog was discharged after the 16th day of treatment weighing 45 pounds and manifested only residual traces of weakness and incoordination. Four weeks after the initiation of treatment, it was reported that the dog had regained its normal weight and activity.

*Example III*

A 20 pound Boxer pup, suffering from posterior paralysis, especially manifesting a flaccid motor paralysis of the hind limb without loss of nervous sensation, and having a history of distemper attack ten days previously, was subjected to the following therapeusis:

For two days, the pup was injected intramuscularly with 1 cc. of a solution containing 16% gelatin, 30 international units of ACTH and 1,000 micrograms of vitamin $B_{12}$. At the end of this period, the animal was able to walk with some degree of weakness. Additional injections of this solution were made on the two days following. At this time complete recovery was obtained and the dog discharged.

If desired, potassium chloride may be included in the daily diet of the animal under treatment to prevent any possibility of hypopotassemia resulting from the ACTH constituent of this composition.

While in the foregoing specification various embodiments of this invention have been set forth and specific details thereof have been elaborated for the purpose of illustration, it will be apparent to those skilled in the art that this invention is susceptible to other embodiments and that many of the specific details set forth herein may be varied widely without departing from the basic concept and spirit of the invention.

I claim:

1. A medicinal composition suitable for parenteral adminstration comprising an adrenocorticotrophin in combination with a vitamin $B_{12}$ material.

2. A medicinal composition suitable for parenteral administration comprising an adrenocorticotrophin in combination with cyanocobalamin.

3. A medicinal product suitable for parenteral administration comprising an adrenocorticotrophin and a vitamin $B_{12}$ material in combination with pharmaceutical gelatin.

4. A medicinal product suitable for parenteral administration comprising an adrenocorticotrophin and cyanocobalamin in combination with pharmaceutical gelatin.

References Cited in the file of this patent

Meites: Proc. Soc. Exptl. Biol. and Med., volume 81, Number 1, October 1952, pages 307 to 311.

Ingle et al.: Proc. Soc. Exptl. Biol. and Medicine, vol. 79, Number 1, January 1952, pages 128 to 131.

Blackberg: Clinical Medicine, vol. 61, Number 2, February 1954, pages 118 to 126 (pages 121 to 122 are of particular interest).

Chow: Proc. Soc. Exptl. Biol. and Med., vol. 87, No. 1, October 1954, pages 38 and 39.